G. POE.
GAS GENERATOR.
APPLICATION FILED JULY 29, 1908.

929,875.

Patented Aug. 3, 1909.

Witnesses

Louis R. Heinrichs

Inventor
George Poe
By Victor J. Evans
Attorney

UNITED STATES PATENT OFFICE.

GEORGE POE, OF SOUTH NORFOLK, VIRGINIA, ASSIGNOR, BY DIRECT AND MESNE ASSIGNMENTS, TO THE POE INVENTION CORPORATION, OF NORFOLK, VIRGINIA, A CORPORATION OF VIRGINIA.

GAS-GENERATOR.

No. 929,875.　　　　Specification of Letters Patent.　　　　Patented Aug. 3, 1909.

Application filed July 29, 1908. Serial No. 445,971.

*To all whom it may concern:*

Be it known that I, GEORGE POE, a citizen of the United States of America, residing at South Norfolk, in the county of Norfolk and State of Virginia, have invented new and useful Improvements in Gas-Generators, of which the following is a specification.

This invention relates to gas generators designed more particularly for use in generating oxygen from sodium peroxid or other peroxid bases, and one of the principal objects of the invention is to provide a generator of light weight and simple construction which can be readily conveyed from place to place by hand.

Another object of the invention is to provide a portable generator of the character referred to in which the various parts are detachable one from the other in order to make the device more convenient in packing and carrying from place to place.

These and other objects may be attained by means of the construction illustrated in the accompanying drawing, in which,—

Figure 1:
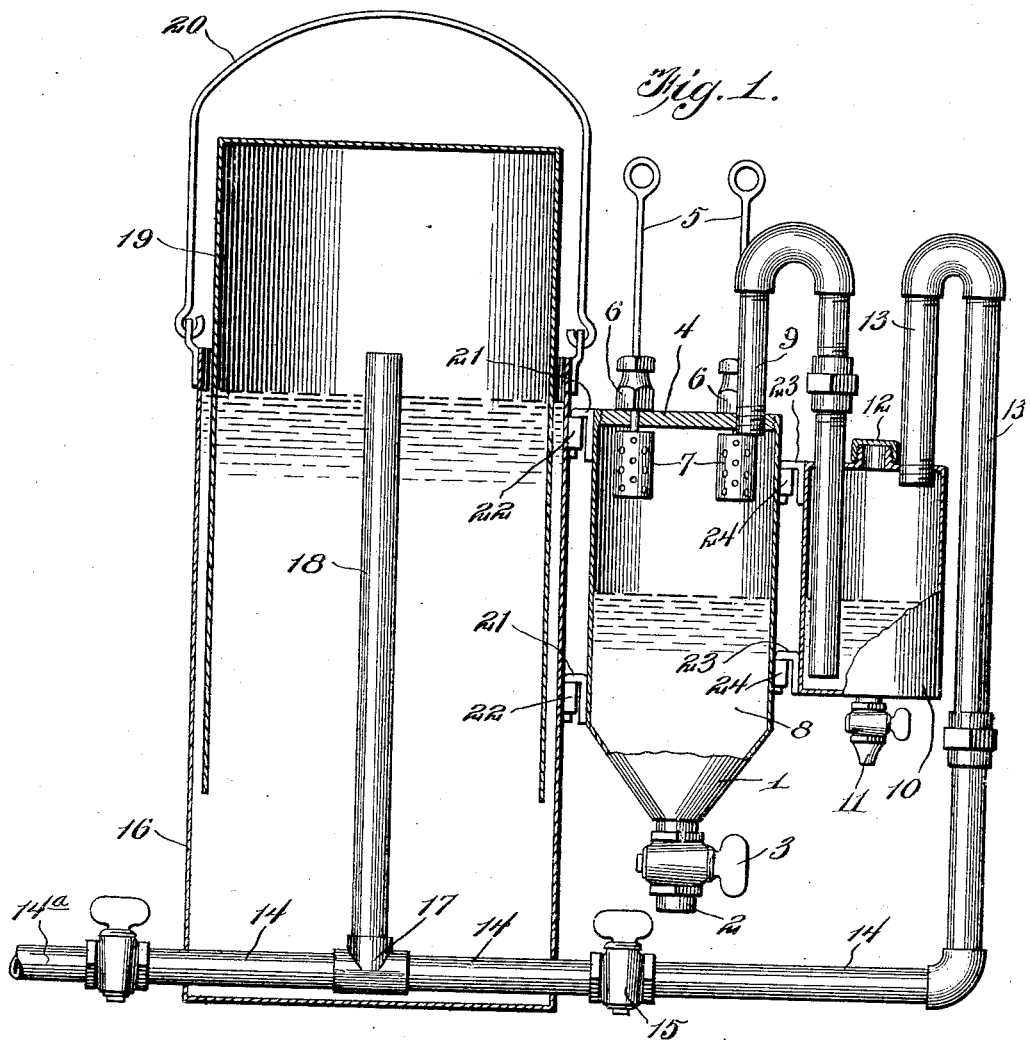
Figure 2:
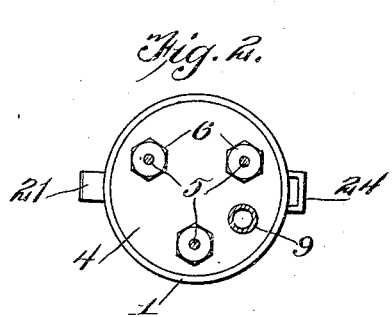
Figure 3:
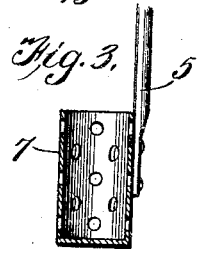

Figure 1 is a vertical sectional view of the apparatus. Fig. 2 is a top plan view of the generator. Fig. 3 is a detail view of the lower end of one of the plungers having a perforated basket or cup connected thereto.

Referring to the drawing for a more specific description of my invention, the numeral 1 designates the generator which, as shown, is provided at its lower end with a suitable clean-out pipe 2 and a cock 3 therefor. In the upper end of the generator is fitted a head 4, and passing through said head are a series of plungers 5, said plungers passing through stuffing boxes 6, and connected to the inner ends of said plungers inside the generator are the foraminous baskets or cups 7 designed for carrying the sodium peroxid in capsules to the water 8. The sodium or other peroxid base may be inclosed within a capsule of thin paper perforated by pin holes and placed within the baskets 7 and submerged in the water 8 by pushing down the plungers 5. The oxygen thus generated passes from the generator through the pipe 9 to a suitable washer or scrubber 10 provided with a clean-out cock 11 and having a screw cap 12 at its upper end to admit water. A pipe 13 leads from the washer down and has connected to it a horizontal branch 14 provided with a cock 15. The pipe 14 extends through a gasometer 16, and connected to the two sections of the pipe 14 inside the gasometer is a T-coupling 17 having a stand pipe 18 connected thereto, said stand pipe extending up above the water line in the gasometer. A gasometer bell 19 fits within the gasometer and is sealed by the water therein. Connected to the gasometer 16 is a bail or handle 20 by means of which the apparatus may be carried, and the generator is provided with hooks 21 adapted to engage keepers 22 on the gasometer. Similar hooks 23 on the washer or scrubber are designed to engage keepers 24 on the generator, thus making the device detachable in parts to facilitate portability.

The operation of my invention may be briefly described as follows: Sodium peroxid or some other peroxid base is inclosed within a paper capsule which is perforated, and these capsules are placed within the baskets 7 and immersed within the water 8. The gas thus generated is led through the pipe 9 down through the body of water in the washer or scrubber 10, from which it rises to the surface of the water and is carried through pipe 13 and pipe 14 up through the stand pipe 18 to the gasometer bell 19 which rises and falls to compensate for the gas generated. From the pipe 18 the gas is led out through the branch pipe 14 to the supply pipe 14ª for inhalation or for other purposes.

From the foregoing it will be obvious that my apparatus is of simple construction, can be carried about from place to place, the parts being detachable one from the other, and will operate quickly and efficiently for its purpose.

Having thus described the invention, what is claimed as new, is:—

The herein described portable oxygen gas generator comprising a tank having a detachable head or cap, a series of plungers comprising rods extending through said head, stuffing boxes through which said plunger rods extend, foraminous baskets carried by said plunger rods, said baskets being movable within the generator, the latter being provided with a conical bottom, an outlet pipe, and means for detachably connecting said generator to a gasometer and to a gas washer.

In testimony whereof I affix my signature in presence of two witnesses.

GEORGE POE.

Witnesses:
  W. H. VENABLE,
  M. G. MULNEY.